United States Patent Office 2,951,885
Patented Sept. 6, 1960

2,951,885

ALKYLATION OF BENZENE AND CATALYSTS THEREFOR

Robert C. Wade, Ipswich, Mass., assignor to Metal Hydrides Incorporated, Beverly, Mass., a corporation of Massachusetts No Drawing. Filed Sept. 3, 1957, Ser. No. 681,441

7 Claims. (Cl. 260—671)

This invention relates to the alkylation of hydrocarbons, particularly aromatic hydrocarbons, and to a catalyst useful for this purpose.

In my copending application Serial No. 558,205, filed January 10, 1956, I have described the preparation of a catalytic mixture useful for the polymerization of olefins, such as ethylene. This catalytic mixture can be prepared by heating a tetrahalide of a metal, such as titanium, zirconium, hafnium or thorium tetrachloride, fluoride, iodide or bromide, with an alkali metal, such as sodium, lithium or potassium, at an effective reducing temperature below that required for complete reduction of the halide.

The present invention is based upon the surprising discovery that a similar mixture, when formed in situ upon an activated alumina or other activated acidic oxide, is an effective catalyst for alkylating hydrocarbons, such as benzene, xylene, naphthalene, mineral oils, etc., which are liquid at the alkylation temperature. Thus, when an olefin is contacted with a liquid hydrocarbon in the presence of this catalyst, the olefin is not polymerized but instead the hydrocarbon is alkylated. The catalyst of the invention is essentially a trihalide of titanium, zirconium, hafnium or thorium, such as the chloride, fluoride, iodide or bromide, supported upon an activated acidic oxide, such as alumina, silica, zirconia, titania, thoria, molybdena or mixtures thereof.

The presently preferred method for preparing the catalyst or catalytic mixture of the invention comprises heating the activated acidic oxide in a gas, such as argon, helium, nitrogen or hydrogen, and alternately adding thereto small amounts of sodium metal and the tetrahalide of a metal selected from titanium, zirconium, hafnium or thorium, preferably, with agitation. After each addition of sodium metal and tetrahalide sufficient time is allowed for the reducing action to take place before the next addition of these reactants. The temperature used should be an effective reducing temperature below that required for complete reduction of the halide to metal, preferably between about 100° C. and 300° C. The amount of sodium metal used should not be greater than that theoretically required to reduce the tetrahalide to the trihalide in order to avoid formation of substantial amounts of the lower halides. Any excess tetrahylide remaining after completing the reaction may be removed, if desired, by vacuum while at an elevated temperature.

In alkylating hydrocarbons, such as benzene, xylene, naphthalene, mineral oils, etc., the catalyst and hydrocarbon may be placed in a high pressure bomb. After sealing the reactor and purging with an olefin, such as ethylene, propylene or butylene, the reactor is filled with the olefin to maintain an effective alkylation pressure therein of about 100 to 800 p.s.i.g. or more and is heated to a temperature above about 100° and below the temperature which leads to cracking of the hydrocarbon, preferably below 300° C. The catalyst of the invention is useful for the continuous alkylation of benzene by reaction with ethylene and, since the catalyst is of the equilibrium type, it is useful for catalyzing the conversion of polyalkyl benzene to monoalkyl benzene.

The invention is illustrated further by the following specific examples:

Example 1

200 grams of activated alumina (14 mesh) was placed in a two liter flask equipped with a sweep type stirrer, inert gas inlet and outlet, sodium addition tube, dropping funnel for titanium tetrachloride addition, thermometer and reflux condenser which was heated by an electric heating mantle. Heating was started and the mass was stirred intermittently and slowly to avoid excessive grinding of the alumina while maintaining an atmosphere of an inert gas within the flask. Small amounts of sodium metal and titanium tetrachloride were added alternately while maintaining the reaction mass at a temperature between 100° C. and 300° C. until 11.5 grams of sodium and 88 grams of the tetrachloride had been added, sufficient time being allowed between additions to complete the reaction while slowly stirring.

50 grams of the gray to purple catalyst together with 100 grams of benzene were placed in an "Aminco" high pressure bomb and the reactor was sealed and purged with ethylene. Then the reactor was filled with ethylene to a pressure of about 500 p.s.i.g. and agitated and heating was started. Ethylene was pressed in to maintain the pressure between 250 and 800 p.s.i.g. Ethylene absorption started when the temperature was about 200° C. Over an eleven hour period, 65 grams of ethylene was absorbed. The product obtained was distilled and analyzed. It consisted of 19.6% benzene, 19.3% ethyl benzene, 20.2% diethyl benzenes, 7.9% triethyl benzenes and 32.9% polyethyl benzenes.

Example 2

50 grams of catalyst prepared as described in Example 1 and 100 grams of benzene were placed in the high pressure bomb and reacted as described in Example 1. The product obtained was a light yellow liquid and contained 10.8% benzene, 14.1% ethyl benzene and the remainder was polyethylated benzene. This product was distilled to remove the benzene and monoethyl benzene. 40 grams of the residue, consisting of polyethyl benzenes, was used to establish that the catalyst of the invention is an equilibrium type.

25 grams of the catalyst prepared as described in Example 1, except that the excess titanium tetrachloride was removed by vacuum while the temperature was still above 200° C., was placed in the high pressure bomb together with 78 grams of benzene, and the 40 grams of the above mentioned residue of polyethyl benzenes. The charge was heated to about 250° C. for about 18 hours under argon. The product was filtered and distilled and contained 47.4% benzene, 34.4% monoethyl benzene and 18.2% poly ethyl benzenes thereby demonstrating that the catalyst is of the equilibrium type.

Example 3

50 grams of catalyst prepared as described in Example 1 was placed in the high pressure bomb together with 100 grams of xylene. Ethylene under a pressure between 300 and 850 p.s.i.g. was maintained in the bomb while being agitated and heated at about 200° C. for 24 hours. 56 grams of ethylene were absorbed. The liquid product obtained was distilled to yield the following fractions above the boiling point of xylene:

88 grams of reddish colored liquid with a boiling point above 150° C. This portion was fractionated further to yield:

4.8 grams at 150°–200° C.
11.0 grams at 202°–215° C.

The remainder was vacuum distilled at 95° to 130° C. (mostly at 100° to 110° C.) at 5 mm. of mercury to yield 64 grams of a pale oily liquid which was found to be polyethyl xylenes as shown in infra red absorption spectra.

*Example 4*

50 grams of catalyst prepared as described in Example 1 was mixed with 100 grams of "Bayol 85," which is an Esso mineral oil not as highly refined as "Nujol," and reacted with ethylene in the high pressure bomb for 19 hours at about 200° C. and an ethylene pressure between 350 and 850 p.s.i.g. Twenty-three grams of ethylene were absorbed. The product was a viscous liquid having an index of refraction of $N_D^{20} 1.4708$. The original mineral oil had an index of refraction of $N_D^{20} 1.4678$. Thus, the catalyst caused alkylation of the mineral oil.

*Example 5*

50 grams of catalyst prepared as described in Example 1 and 128 grams of naphthalene were placed in the high pressure bomb and agitated and heated for 2 hours at 240° C. under a pressure of 200 to 800 p.s.i.g. of ethylene. 17 grams of ethylene were absorbed. The alkylated naphthalene was orange colored prior to purification.

*Example 6*

200 grams of dried silica gel was heated to 250° C. under vacuum for 1 hour to remove traces of water. Then the vacuum was broken to argon. At this point, 12 grams of sodium metal was added to the stirred bed of silica gel alternately with 0.5 mole of titanium tetrachloride. The tetrachloride was reduced on the surface of the silica gel to form a violet to gray coating. The temperature during this reduction was maintained at 230° to 270° C. At the end of the reduction step, vacuum was applied to remove any unreacted titanium tetrachloride.

50 grams of this catalyst was mixed with 63 grams of benzene and placed in the high pressure reactor which was purged with ethylene. The reactor was pressured to about 300 p.s.i.g. with ethylene and heated to 250° C. The pressure rose to about 800 p.s.i.g. and then decreased as ethylene was absorbed. After 20 hours, 5 grams of ethylene was absorbed. The product consisted of a mixture of unreacted benzene, monoethyl benzenes.

This application is a continuation-in-part of my copending application Serial No. 604,067, filed August 15, 1956, now abandoned.

I claim:

1. In the method for alkylating benzene wherein an olefin is contacted with benzene in the presence of a catalyst, the improvement wherein the catalyst consists essentially of a trihalide of a metal selected from the group consisting of titanium, zirconium, hafnium and thorium adsorbed on an activated acidic oxide and is preformed by alternately mixing small amounts of an alkali metal and the tetrahalide of a metal selected from titanium, zirconium, hafnium and thorium with an activated acidic oxide while heating the mixture at a temperature between about 100° C. and 300° C., the total amount of alkali metal used being not greater than that theoretically required to reduce the tetrahalide to the trihalide, said alkali metal being selected from the group consisting of sodium, lithium and potassium.

2. The method as described by claim 1 wherein the selected metal is titanium.

3. The method as described by claim 2 wherein the acidic oxide is alumina.

4. The method as described by claim 2 wherein the acidic oxide is silica.

5. The method as described by claim 2 wherein the olefin is ethylene.

6. The method as described by claim 3 wherein the olefin is ethylene.

7. The method as described by claim 4 wherein the olefin is ethylene.

References Cited in the file of this patent

UNITED STATES PATENTS

| | | |
|---|---|---|
| 2,406,869 | Upham | Sept. 3, 1946 |
| 2,721,189 | Anderson et al. | Oct. 18, 1955 |
| 2,824,145 | McCall et al. | Feb. 18, 1958 |

OTHER REFERENCES

Calloway: Chemical Reviews, vol. 17, 1935, pp. 327 and 374–377 (page 375 only relied on).